United States Patent [19]
Aznar et al.

[11] Patent Number: 5,768,273
[45] Date of Patent: Jun. 16, 1998

[54] METHOD AND APPARATUS FOR PRIORITY LEVEL QUEUEING IN PROCESSING ATM CELL HEADER AND PAYLOAD

[75] Inventors: Ange Aznar, Saint Laurent du Var; Jean Calvignac, La Gaude; Daniel Orsatti, Cagnes Sur Mer; Dominique Rigal, Nice; Fabrice Verplanken, La Gaude, all of France

[73] Assignee: International Business Machines Corporation, Armonk, N.Y.

[21] Appl. No.: 547,828

[22] Filed: Nov. 1, 1995

[30] Foreign Application Priority Data

Apr. 5, 1995 [EP] European Pat. Off. ............ 95480042

[51] Int. Cl.$^6$ ...................................................... H04J 3/22
[52] U.S. Cl. ........................................... 370/395; 370/236
[58] Field of Search ....................... 395/200.13; 370/395, 370/236, 398, 353

[56] References Cited

U.S. PATENT DOCUMENTS

| | | | |
|---|---|---|---|
| 5,126,999 | 6/1992 | Munter | 370/415 |
| 5,144,619 | 9/1992 | Munter | 370/353 |
| 5,278,828 | 1/1994 | Chao | 370/394 |
| 5,394,397 | 2/1995 | Yanagi et al. | 370/390 |
| 5,541,926 | 7/1996 | Saito | 370/474 |
| 5,577,035 | 11/1996 | Hayter | 370/395 |

OTHER PUBLICATIONS

European Search Report.

*Primary Examiner*—Tod R. Swann
*Assistant Examiner*—Christopher Chow
*Attorney, Agent, or Firm*—Gerald R. Woods

[57] ABSTRACT

An ATM switch includes one or more adapters having input ports and/or output ports and a switching fabric for switching Asynchronous Transfer Mode (ATM) cells received at the input ports to the output ports. To maintain switch throughput, cells are categorized either as real time (high priority) or non-real time (lower priority) cells. High priority cells are processed using a first set of cell processing logic at a rate at least equal to the rate at which the cells are received on the input ports. Lower priority cells are processed using a second set of cell processing logic only when no high priority cells are being processed.

6 Claims, 14 Drawing Sheets

METHOD AND APPARATUS FOR PRIORITY LEVEL QUEUEING IN PROCESSING ATM CELL HEADER AND PAYLOAD

CROSS REFERENCE TO RELATED APPLICATIONS

The present invention is related to the below-listed applications filed on the same date as this application and commonly assigned to the assignee of this invention: Ser. No. 08/548,029 (now U.S. Pat. No. 5,673,263), Ser. No. 08/547,825 (now abandoned in favor of continuing application Ser. No. 08/547,825), Ser. No. 08/548,030 (now U.S. Pat. No. 5,684,797), Ser. No. 08/547,826 (now U.S. Pat. No. 5,666,361), and Ser. No. 08/547,827 (now U.S. Pat. No. 5,668,798).

FIELD OF THE INVENTION

The present invention relates to communications in general, and more particularly to a method and apparatus for priority level queueing in processing ATM (Asynchronous Transfer Mode) cell headers and payloads in a communication system.

BACKGROUND OF THE INVENTION

In typical ATM networks, the types of traffic range from raw ATM flow with different traffic management characteristics, up to various cell-based control traffic where information is transported in the ATM cell payload, all the necessary processing done in common resources for a plurality of physical ports connected to the local data communication node.

Reference may be made to the following publications, for details of ATM technology, including concepts and techniques employed in implementing the present application:

J. Y. LeBoudec, "The Asynchronous Transfer Mode: A tutorial", Comp Networks ISDN, 24, pp. 279–309, May 15, 1992.

The ATM Forum, "UNI Specification", Version 3.0, Prentice Hall, ISBN 0-13-225863-3, September 1993, and Version 3.1, September 1994.

The ATM Forum, "Interim Inter-Switch Signalling Protocol (IISP)", Draft 94-0924R2, November 1994.

The ATM Forum, "P-NNI Draft Specification", Draft 94-0471 R3, 1994.

In multiple port communication nodes used in ATM networks, the ATM layer processing is usually performed by dedicated hardware and microcode resources per port, and using functions dedicated to the ATM layer.

Queueing of ATM cells between the plurality of ports and the internal switch is necessary in order to accommodate the speed differences between the various ports and the speed of the switch, and possibly to accommodate the speed differences between the various ports themselves. Queueing is also necessary in order to handle different types of traffic flows.

Usually, the queueing function is done with the help of a very fast microprocessor dedicated to one or few ports, or by specific hardware resources also dedicated to one or few ports.

In order to accommodate ATM traffic requirements, the ATM layer must process some types of traffic in real time avoiding any delay in cell transmission due to the ATM cell processing. This requires resources that work on-the-fly, such as dedicated FIFO-based logic to process the ATM header in real time.

On the other hand, especially where Local Area Network, or LAN traffic is involved there is a need to manipulate non-real (low priority) time traffic without interfering with any concurrent real time (high priority) traffic mixed on the same network resources.

SUMMARY OF THE INVENTION

There is a need for an efficient common queueing mechanism which can share real time and non-real time traffic flows.

The invention is implemented in an adapter of an ATM switch including input port adapters and output adapters and a switching fabric for switching input ATM data cells from an input port adapter to an output port adapter. The adapters include memory, data moving means and cell processing means for performing ATM layer functions on the cells being processed and output buffers. The adapter includes a first functional layer which processes cell in real time; i.e., at the same rate as which cells arrive at the ATM switch and a second functional layer which processes cells a non-real time basis. The second functional layer, which includes buffers for holding intermediate results, operates during idle cycles of the real time cell processing functional layer.

BRIEF DESCRIPTION OF THE DRAWINGS

Details of the invention will be better understood from the following detailed description read in conjunction with the following drawings.

DESCRIPTION OF PREFERRED EMBODIMENT

Figure 1:
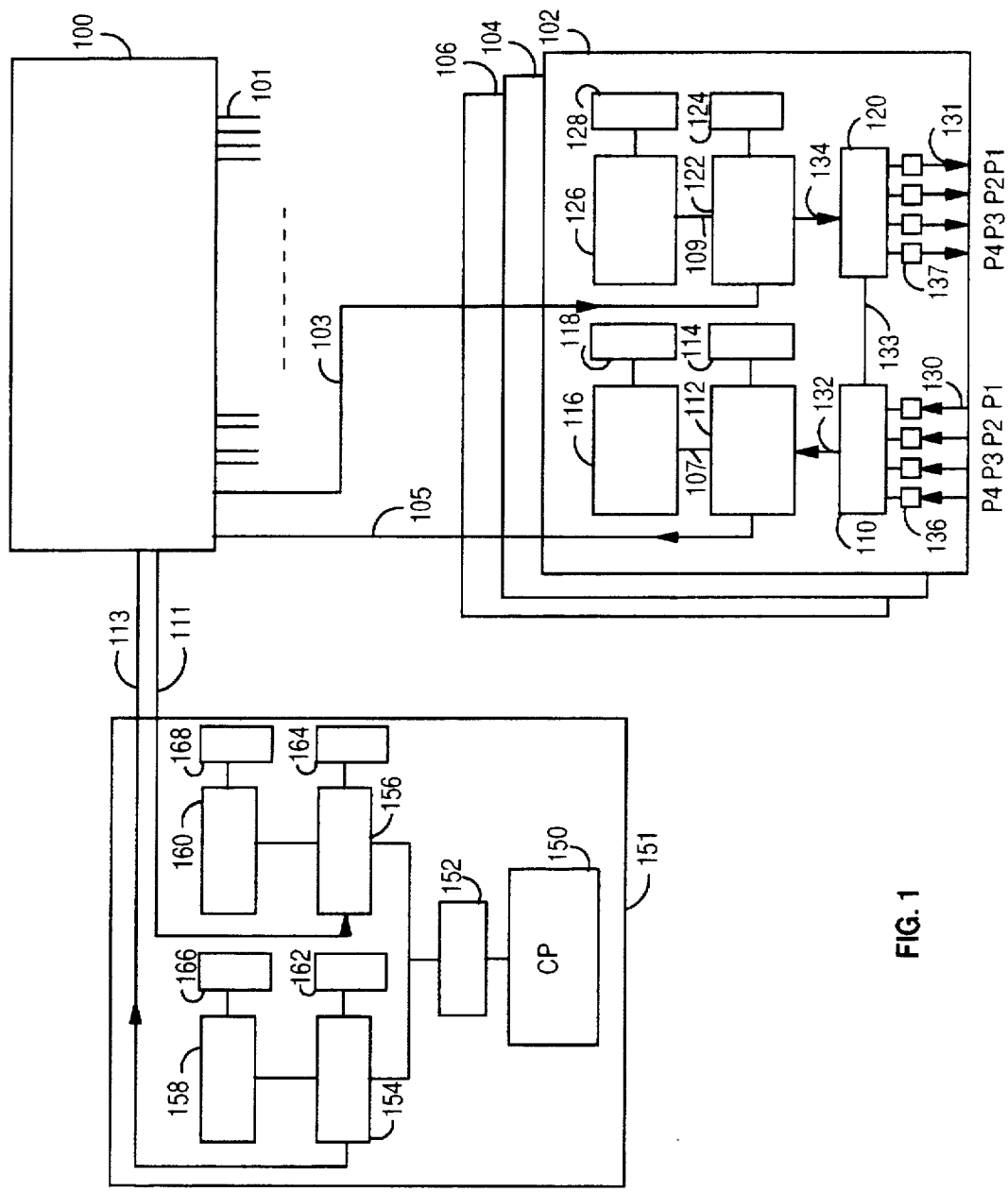
FIG. 1 depicts the general structure of an ATM switch.

A typical communication system for ATM communication is described in FIG. 1 Switch 100, capable of switching data packets from any to any of its Switch_I/Os 101, is connected to at least a Control 151 through leads 111 and 113, and a Blade 102 through leads 103 and 105. There could be several other blades, Blade 104, Blade 106, etc. ... each connected to one of Switch_I/Os 101. Control 151 has the main functions of controlling the ATM network and the whole system's ATM switching resources. It comprises a Control_Processor 150, which can be a microprocessor. Said Control_Processor 150 is connected to a Control_SFE_UP_DOWN 152 (SFE for Specific Front END) which itself is connected to Control_CAD_UP 154 (CAD for Common ATM Data Mover) with the flow of data coming from Control_SFE_ UP_DOWN 152, and Control_CAD_DOWN 156 (with the flow of data going to Control_SFE_UP_DOWN 152). Control_SFE_UP_ DOWN 152 has the main functions of performing DMA transfers between Control_Processor 150, Control_CAD_ UP 154 and Control_CAD_DOWN 156 to exchange flows of data. Control_CAD_UP 154 has the main functions of queueing data exchanged on its various interfaces and feeding Control_CAP_UP 158 (CAP for Common ATM Processor) with the appropriate data fields. It interfaces with Control_CAP_UP 158, which is a processor performing the ATM layer handling for ATM cells, and one of Switch_I/Os 101. Control_CAD_DOWN 156 has the main functions of queueing the ATM cells exchanged on its various interfaces, and feed Control_CAP_DOWN 160 with the appropriate cell fields. It interfaces with Control_CAP_DOWN 160, which is a processor performing the ATM Layer handling for ATM cells, and one of Switch_I/Os 101. Control_RAM 162, Control_RAM 166, Control_RAM 168, and Control_RAM 164 are storing means respectively connected to and used by Control_CAD_UP 154, Control_CAP_UP 158, Control_CAP_DOWN 160, and Control_CAD_DOWN 156. Blade 102 has the main functions of concentrating a plurality of ATM ports, before performing the ATM Transmission Convergence (TC) sublayer and the ATM layer functions. Several identical blades could also be connected to Switch_I/Os 101, as many as permitted by Switch 100. Blade_SFE_UP 110 and Blade_SFE_DOWN 120 have the main functions of respectively multiplexing and demultiplexing the ATM TC sublayer for a plurality of ATM ports, such as Blade_ATM_Inputs 130 and Blade_ATM_Outputs 131. Each of Blade_ATM_Inputs 130 is connected to Blade_SFE_UP 110 through a Physical Media Dependent (PMD) Blade_ATM_Interface_Chips 136. Each of Blade_ATM_Outputs 131 is connected to Blade_SFE_DOWN 120 through a PMD Blade_ATM_Interface_Chips 137. Represented ports P1-P4 are at the ATM UNI interface. Blade_CAD_UP 112, Blade_CAP_UP 116, Blade_CAD_DOWN 122 and Blade_CAP_DOWN 126 perform the same functions as Control_CAD_UP 154, Control_CAP_UP 158, Control_CAD_DOWN 156 and Control_CAP_DOWN 160 respectively. Blade_RAM 114, Blade_RAM 118, Blade_RAM 124 and Blade_RAM 128 are storing means respectively connected to and used by Blade_CAD_UP 112, Blade_CAP_UP 112, Blade_CAP_UP 116, Blade_CAD_DOWN 122 and Blade_CAP_DOWN 126. ATM data flow can be exchanged from any of Blade_ATM_Inputs 130 of any Blade 102 to Control_Processor 150 or to any of Blade_ATM_Outputs 131 of any Blade 102, and vice-versa.

Such an implementation of a communication system is merely given as an illustration, of a suitable environment for the present invention. The invention is equally useful in a communication system which is not modular (i.e. does not comprise physically separated blades), which comprises switching resources other than a a Switch 100 (for example a bus), which features a splitting of processing functions other than into CAP-CAD-SFE, etc. . . .

The first part of this description aims at describing part of the incoming side, specifically the Common ATM Data mover module (Control_CAD_UP 154 or Blade_CAD_UP 112) and the contents of associated control RAMs (Control_RAM 162 or Blade_RAM 114).

The detailed description of the preferred embodiment is given with references to Blades 102, 104, 106, but is fully applicable to Control 151. For simplicity, both the external memories Control_RAM 162 and Blade_RAM 114 will be referred to as CADS_UP; both the external memories Control_RAM 164 and Blade_RAM 124 will be referred to as CADS_DOWN.

Figure 2:
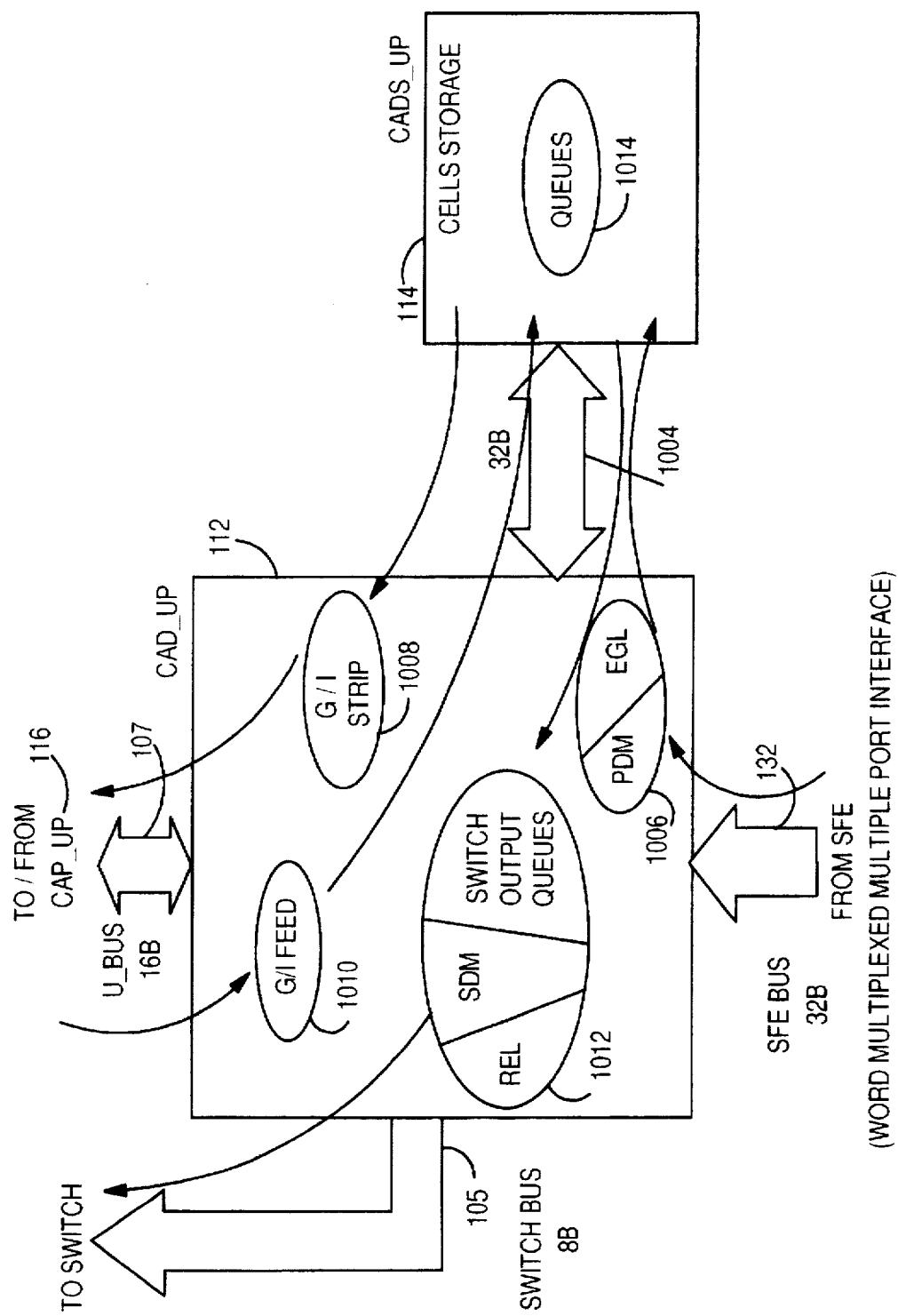
FIG. 2 and 11 show the data flows between the memory and data moving unit of the ATM adapter.

As shown on FIG. 2, the data flow of the CAD_UP 112 is composed of three main flows: Port Data Movement 1006, G Strip and I Strip 1008 and G Feed and I Feed 1010 converging on U-Bus 107, and Switch Data Movement 1012.

The Port Data Movement PDM 1006 assembles the incoming words (32 bits each cycle) from one of the ports on the SFE Bus 132 into cells in the external memory CADS_UP 114. When 13 words are received, a cell is complete. The 13 words correspond to 4 bytes of the ATM cell header excluding the HEC byte, followed by the 48 bytes of the ATM cell payload. The cell pointer (Cell Address "CELA") is kept in the G Queue (part of Queues 1014) by the EGL mechanism 1006. The PDM process 1006 is done in real-time, i.e on the fly, to sustain the incoming ports throughput.

Figure 3:
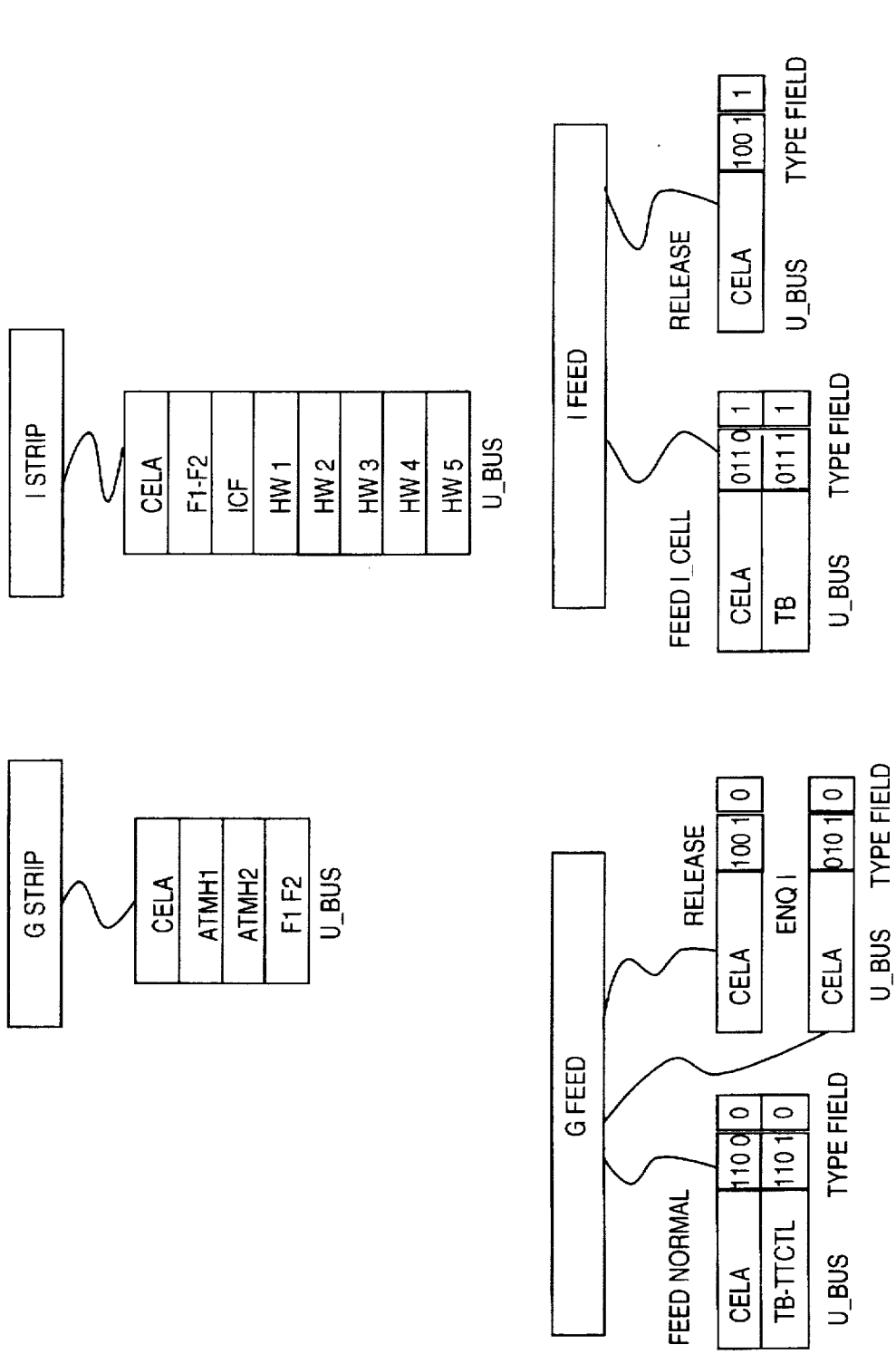
FIG. 3 represents the format of data exchanged between two sections of the ATM adapter.

G Strip, G Feed, I Strip, I Feed exchange information on the U-Bus 107 between the CAD_UP 112 and the CAP_UP 116, the formats of which are detailed in FIG. 3.

When a cell is held in the G Queue, the function G Strip 1008 of the CAD_UP 112 sends to the CAP_UP 116 the minimum information needed to perform the forwarding of the cell: Cell Address CELA, ATMH1 and ATMH2 containing the VPI and VCI, F1F2 containing the Source Port SP, and control information characterizing the cell.

The function G Feed 1010 receives information fed back by the CAP_UP 116, corresponding to the following cases:

When the cell belongs to an established connection, it is updated with the forwarding information and enqueued in the appropriate Switch Output queue in 1012. The information received in this case follows the Feed Normal format containing Cell Address CELA, Target Blade TB and Traffic Type TTCtl, as shown in FIG. 3.

When the cell is an internal control cell sent by the Control_Processor 150, it is enqueued in the I Queue in 1014 for further process. The information received in this case follows the Enq I format containing only Cell Address CELA, as shown in FIG. 3.

When the cell does not belong to an established connection, it is released by the REL function in 1012. The information received in this case follows the Release format containing only Cell Address CELA, as shown in FIG. 3.

G Strip and G Feed processes are done on the fly, unlike the I Strip and I Feed processes which can only take place when no G process has to be run.

When a cell is held in the I Queue in 1014, the I Strip function 1008 of the CAD_UP 112 sends all the required information needed to perform the task requested by the cell. For instance, an internal control cell contains the information defined in the I Strip format. As shown in FIG. 3, the I Strip format contains Cell Address CELA, F1 F2 containing the Source Port, Internal Control Field ICF specifying the type of action to be taken with this cell, Half Word 1 "HW1" to Half Word N "HWN" of the cell payload—the number of Half Words to be considered in the cell payload being determined by the Internal Control Field value.

The function I Feed 1010 receives information fed back by the CAP_UP 116, corresponding to the following cases:

When the task requested by the cell is completed, the cell is released by the REL function in 1012. The information received in this case follows the Release format containing only Cell Address CELA, as shown in FIG. 3.

When the task requested does not involve the CAD_UP 112 or CAP_UP 116, the cell is updated with the forwarding information and enqueued in the appropriate Switch Output Queue in 1012. The information received in this case follows the Feed I Cell format containing Cell Address CELA, and Target Blade TB, as shown in FIG. 3.

The I Strip and I Feed processes are considered as non-urgent or low priority. They can run only if no G process is running.

The Switch Data Movement (SDM) in 1012 forwards a cell queued in the Switch output queues to the Switch 100 via the Switch Bus 105.

Each word of the cell is fetched from the external memory CADS_UP 114 and sent as 4 bytes on the Switch Bus 105.

This process is done at Switch speed. The SDM 1012 serves the queue containing cells from G Process before it serves the queue containing cells from I Process.

The above flow description shows that two layers of processes are implemented in the CAD_UP 112: G Process and I Process.

Figure 4:
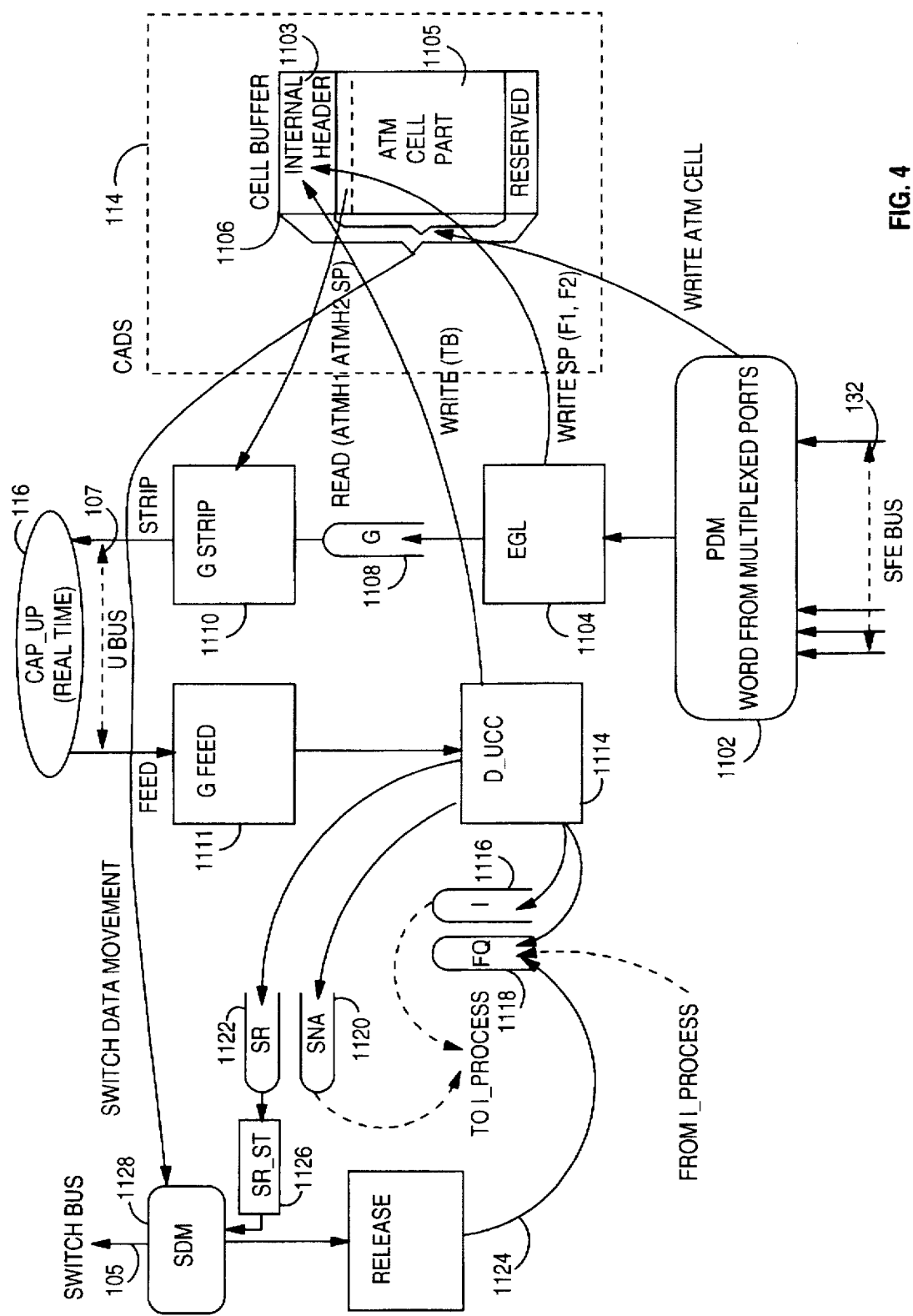
FIG. 4, 5, 12 and 13 show the operating processes of an embodiment of the invention.

The G Process flow is shown in FIG. 4.

The G Process follows decisions by the CAP_UP 116 on the ATM Header received by the G Strip operation, along with the Source Port indication and the type of cell. The CAP_UP 116 reads the ATM Header and provides all information needed by the G process in order to decide if the cell processing has to be done in real time by this G Process or if the cell processing must be given to the I Process and to exploit the processor forwarding information found by the CAP_UP 116 after SP/ATM Header look-up function. This information is the Target Blade TB which must be identified to the switch to forward the given cell to the appropriate Target Blade.

The Port Data Movement (PDM) 1102 is explained below.

An incoming cell received on the SFE Bus 132 is received word by word, each word being associated with the indication of its Source Port SP.

Furthermore, each port being time multiplexed on the SFE Bus 132, the PDM 1102 covers all ports, and assembles cells from each port in the corresponding Cell Buffer 1106 of the external memory CADS_UP 114. The size of the Cell Buffer 1106 is 16 words. The 13 words of each cell are written in the ATM Cell part 1105 of the Cell Buffer 1106. Then the PDM 1102 supplies the EGL 1104 with the address pointer ("CELA") of the cell, and the Source Port SP, and also writes SP in the Internal Header part 1103 of the Cell Buffer 1106.

The Enqueue in G Queue and EGL 1104 uses the Cell Address CELA given by the PDM 1102 to enqueue the received cell in the G Queue 1108. Then, it reserves a new Cell Buffer 1106 by dequeueing a new cell pointer from the Free Queue 1118 to allow further data movement for the same Source Port. This Source Port SP is written in the F1F2 field of the Internal Header 1103.

The Free Queue 1118 is the chain of all Cell Buffers currently available.

The G Strip function 1110 dequeues the next cell from the G Queue 1108. Then it sends the following to the CAP_UP 116: the Cell Address CELA, the VPI and VCI fields, the F1F2 field containing the Source Port and control information characterizing the cell, retrieved from the Cell Buffer 1106.

The G Feed function 1111 accepts the response of the CAP_UP 116 to the G Strip. Since G Strip 1110 and G Feed 1111 are asynchronous functions, the response is correlated with the Cell Address CELA, and it carries information defining the process to be performed.

The Direct U_BUS reception mechanism D_UCC 1114 performs different tasks depending on the type of response received by G Feed 1111:

Upon reception of Release format, as described in FIG. 3, the D_UCC 1114 releases the cell by enqueing it in the Free Queue 1118.

Upon reception of Enq I format, as described in FIG. 3, the D_UCC 1114 postpones the cell for I Processing by enqueueing it in the I Queue 1116.

Upon reception of Feed Normal format, as described in FIG. 3, the D_UCC 1114 writes the Target Blade field TB in the Internal Header part 1103 of the Cell Buffer 1106, and enqueues the cell in the SR Queue 1122 or in the SNA Queue 1120 depending on the value of the TTCtl field received by G Feed 1111.

The Switch Data Movement SDM 1128 is triggered by the function SR_ST 1126 which determines that the SR Queue 1122 is not empty. SR_ST 1126 reads the 16 words of the Cell Buffer 1106 and sends them as contiguous sequences of 4 bytes to the Switch Bus 105. Once the last byte has been sent, the Cell Buffer is directed to the Release function 1124.

The Release function 1124 releases the Cell Buffer 1106 by enqueueing it in the Free Queue 1118.

Figure 5:
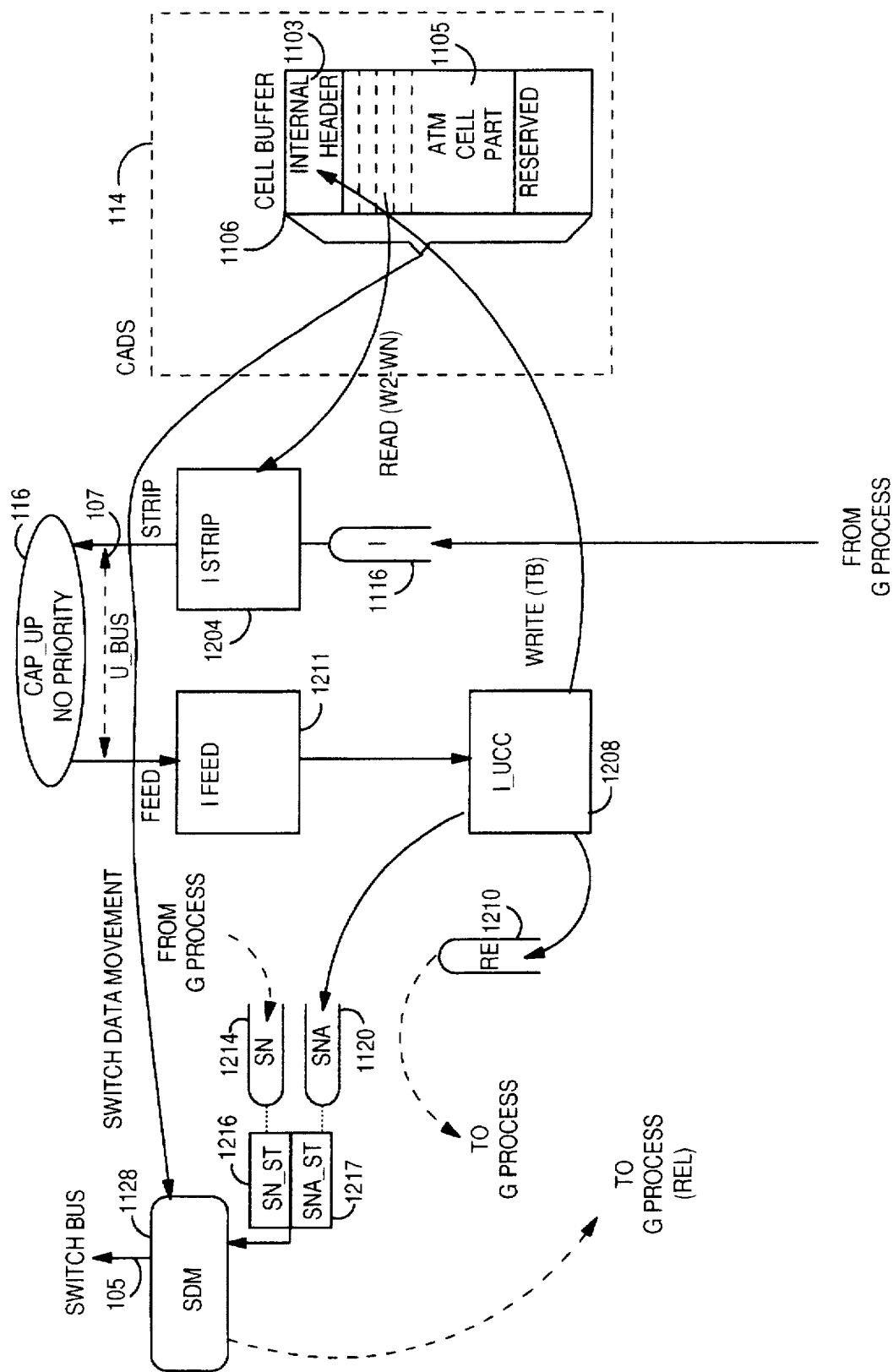

The I Process flow is shown on FIG. 5.

The I Process performs all actions that can be delayed by a G Process action. The I Process can be initiated based on CAP_UP 116 analysis of the ATM Payload, which is furnished to CAP_UP 116 by the I strip operation. As the I Process is not a real time process, longer fields can be exchanged in this process compared to the G Process. The I Process is used to handle Internal Control Cells.

The I Process can be used to generate Local Area Network Media Access Control (MAC) addresses in order for CAP_UP 116 to perform LAN frame forwarding on ATM connections dedicated to transport of LAN traffic. It can also be used to give the IP Address to CAP_UP 116 or any network address found inside the ATM Cell payload.

The I Strip function 1204 dequeues the next cell from the I Queue 1116, then it sends the following to CAP_UP 116 the Cell Address CELA, the F1 F2 field containing the Source Port SP and control information characterizing the cell, the Internal Control Field ICF, and word 2 to word N of Cell Buffer 1106, the value of N being taken from the ICF field, shown in FIG. 3.

The I Feed function 1211 accepts the response of the CAP_UP 116 to the I Strip. Since I Strip 1204 and I Feed 1211 are asynchronous functions, the response is correlated with the Cell Address CELA and carries information defining the process to be performed.

The Indirect U_BUS reception mechanism I_UCC 1208 performs different tasks depending on the type of response received by I Feed 1211:

Upon reception of Release format, shown in FIG. 3, the I_UCC 1208 prepares release of the cell by enqueing it in the Relay Queue RE 1210. The dequeue of the RE queue 1210 will be handled by the G Process, in order to release the cell. This RE queue 1210 acts as a relay between I and G processes.

Upon reception of Feed I Cell format, shown in FIG. 3, the I_UCC 1208 writes the Target Blade field TB in the Internal Header part 1103 of the Cell Buffer 1106, and enqueues the cell in SNA Queue 1120.

The Switch Data Movement SDM 1128 is triggered by the function SN_ST 1216 or SNA_ST 1217 which indicate that, respectively, the SN Queue 1214 or SNA Queue 1120 is not empty. The two queues SN Queue 1214 and SNA Queue 1120 provide two levels of priority in the I Process low priority domain. The Switch Data Movement SDM 1128 reads the 16 words of the Cell Buffer 1106 and sends them as contiguous sequences of 4 bytes to the Switch Bus 105. Once the last byte has been sent, the Cell Buffer is directed to the Release function 1124.

Figure 6:
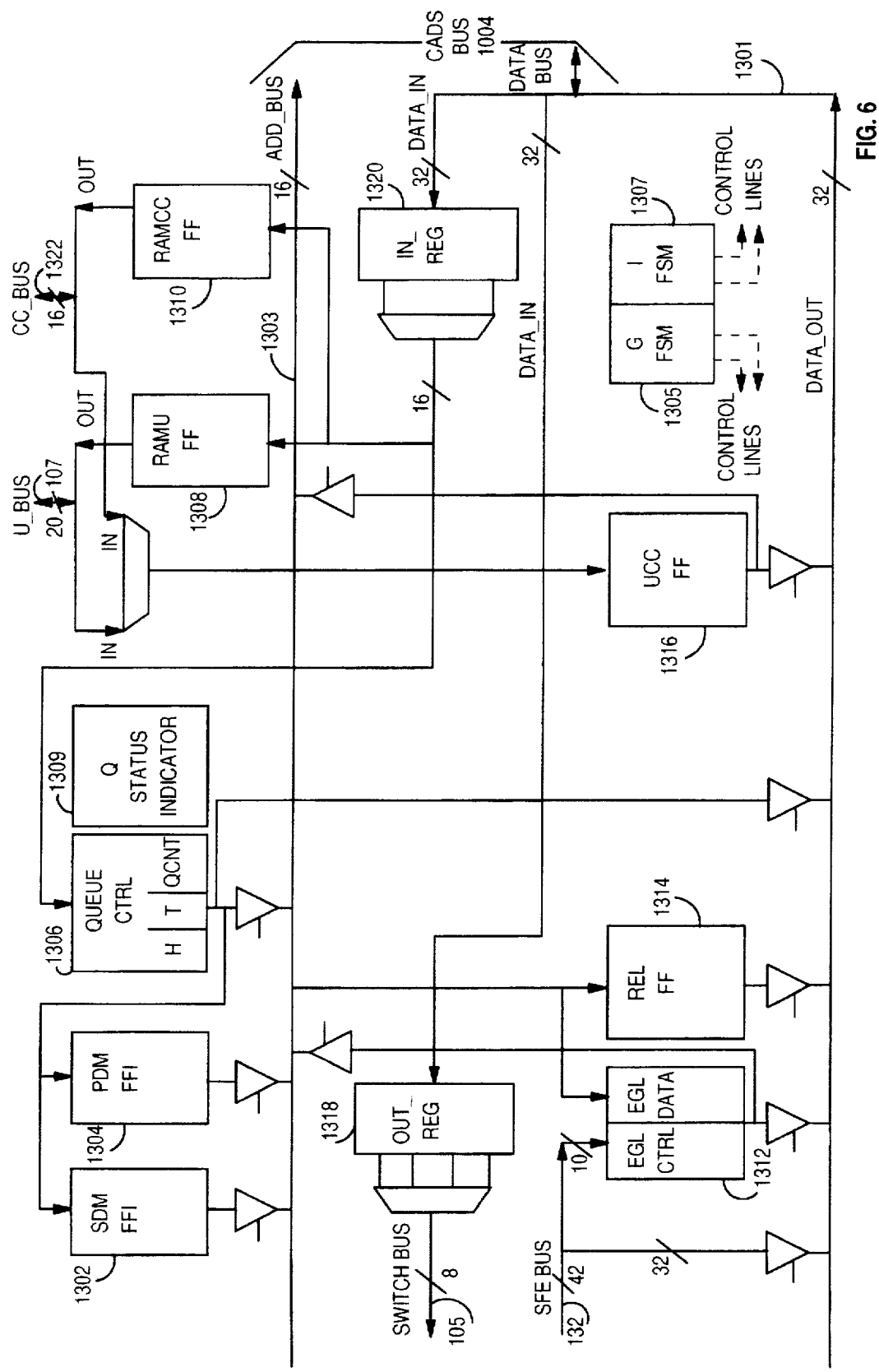
FIG. 6 and 14 illustrate the hardware components used for the processes of FIG. 4, 5, 12 and 13.

The CAD_UP Structure is detailed below. The CAD_UP 112, as depicted in FIG. 6, contains internal RAMs 1306 used to store pointers and cell counts in order to manage the various queues of the CAD_UP. Other internal RAMs such as 1302, 1304, 1308, 1310, 1312, 1314, 1316 are used as stacks, or Flip-Flop buffers to store information waiting to be processed by the appropriate sub-function of the Finite State Machine 1305 or 1307 or to be exchanged on the appropriate interface.

The outputs of these internal RAMs are multiplexed onto the internal address bus or data bus used to access the external memory CADS_UP 114.

The data flow shown on the previous figures run on the following buses:

The SFE_BUS 132 has 32 bits of Data which are directly sent on the CADS_DATA_BUS 1301 and 10 control lines qualifying the data word, for example by specifying the Source Port SP of the word. The control bits are written in the EGL Control RAM 1312.

The CADS_DATA_BUS 1301 (OUT part) takes 32 bits multiplexed from either the SFE_BUS 132, the EGL 1312, the REL 1314, the Queue Ctrl 1306, the UCC FF 1316. The CADS_DATA_BUS 1301 (IN part) is sent either to the IN_REG 1320 or the OUT_REG 1318.

The 16 bit CADS_ADD_BUS 1303 is multiplexed from the SDM FF 1302, the PDM FFi 1304, the Queue Ctrl 1306, the EGL data 1312, the UCC FF 1316.

The 20 bit U_BUS 107 is composed of the U_BUS OUT which is directly sent from the RAMU FF 1308, and the U_BUS IN which is written in the UCC FF 1316.

The 20 bit CC_BUS 1322 is composed of the CC_BUS OUT which is directly sent from the RAMCC 1310, and the CC_BUS IN which is written in the UCC FF 1316.

The 8 bit SWITCH BUS 105 is generated by multiplexing the 4 bytes of the OUT_REG 1318.

Each RAM block in the CAD_UP structure is either a 16 entry RAM or a 32 entry RAM, followed by a 16 bit register or 32 bit register, respectively.

Each block of the CAD_UP structure is listed below:

The SDM FF 1302, has 2 Flip-Flops of Cell Addresses CELA ready to be transmitted, one for cells enqueued in SR Queue 1122, one for cells enqueued in SN Queue 1214 and SNA Queue 1120. It is fed by the QUEUE Ctrl 1306 with the Head value of the appropriate switch queues when a cell is to be sent on the Switch Bus 105. The Flip-Flop structure allows the SDM 1128 to use a Cell Address CELA for transmitting a cell on the Switch Bus 105 while simultaneously reloading a new Cell Address CELA for the next cell transfer.

The PDM FFi 1304 contains one Flip-Flop of Cell Address CELA per port i. It is fed by Queue Ctrl 1306 with the Head value of the Free Queue 1118. The Flip-Flop structure allows the PDM 1102 to use a Cell Address CELA for receiving a cell from the SFE Bus 132 while simultaneously reloading a new Cell Address CELA for the next cell transfer.

Queue Ctrl 1306: The QUEUE Ctrl H contains the Head value of each Queue of the CAD_UP, i.e. Free Queue 1118, G Queue 1108, I Queue 1116, SR Queue 1122, SN Queue 1214, SNA Queue 1120 and RE Queue 1210.

The QUEUE Ctrl T contains the Tail value of each Queue of the CAD_UP, i.e. Free Queue 1118, G Queue 1108, I Queue 1116, SR Queue 1122, SN Queue 1214, SNA Queue 1120 and RE Queue 1210.

QUEUE Ctrl H and QUEUE Ctrl T are fed by the enqueueing and dequeueing mechanisms, the values being taken from the CADS_DATA_BUS 1301. The QUEUE Qcnt holds the number of cells in each Queue of the CAD_UP, i.e. Free Queue 1118, G Queue 1108, I Queue 1116, SR Queue 1122, SN Queue 1214, SNA Queue 1120 and RE Queue 1210. It is incremented after each enqueue operation and decremented after each dequeue operation.

The Queue Status Indicator 1309 is a 1 bit register per queue, giving the empty/not empty indication.

The RAMU FF 1308 has a Flip Flop for G strip information and a Flip Flop for I strip information ready to be sent to the CAP_UP 116, when a cell has been dequeued from G Queue 1108 or I Queue 1116.

The RAMCC FF 1310 is dedicated to the communications from CAD_UP 112 to CAD_DOWN 122 done through the CC_BUS 1322.

The EGL data & Ctrl 1312 is a stack filled with CELAs when a cell has been received from the PDM interface. The EGL CELAs and Controls are used by the EGL mechanism.

The REL FF 1314 has a flip flop of CELAs to be released after SDM data movement. The UCC FF 1316 has a Flip Flop for G Feed information and a Flip Flop for I Feed information sent by the CAP_UP 116, to be used by the D_UCC 1114 or I_UCC 1208 mechanisms.

The IN_REG 1320 is a 32 bit register which stores the CADS_DATA_BUS 1301 and allows demultiplexing into 16 bit words for writing to internal RAMs.

The OUT_REG 1318 is a 32 bit register which stores the CADS_DATA_BUS 1301 and allows demultiplexing into 8 bit words which are sent to the Switch Bus 105.

The G FSM 1305 and the I FSM 1307 control all the preceding blocks of the structure by means of dedicated states describing the control actions to be taken.

In order to sustain the maximum aggregate throughput, the external memory CADS_UP 114 containing the queues of cells is accessed in a cycle half the duration of the internal CAD_UP 112 cycle. External access to the external memory CADS_UP 114 requires several cycles to prepare address and data, to perform the read or write operation in the external memory CADS_UP 114 and to re-synchronize the result of a Read operation inside the internal CAD_UP 112 cycles. The result is a 5 cycle pipeline.

The Finite State Machine FSM scheduling the various operations of all processes is structured in order to minimize the overhead resulting from the 5 cycles pipeline latency.

The pipeline structure is composed of 5 cycles named A0, A1, A2, A3 and A4, for which the following actions are taken:

In cycle A0 the FSM step is decided. Then, all FSM actions follow in the next 4 cycles A1, A2, A3 and A4.

The cycle A1 is used to read Internal RAMs and get CADS base address, and data to be writen in the case of a write operation in external memory CADS_UP 114.

In cycle A2 the external memory CADS_UP 114 access occurs.

The cycle A3 is used for data acquisition in the case of a read operation in external memory CADS_UP 114.

The cycle A4 is used to write Internal RAMs with the result of the read operation in external memory CADS_UP 114.

The Q Ctrl 1306 and the Queue Status Indicator 1309 associated with the appropriate Finite State Machine FSM actions perform all the enqueue and dequeue functions for the various queues used by the CAD_UP 112. These enqueue and dequeue processes work as follows.

In order to maximize the aggregate throughput, the enqueue and dequeue operations are each done in one cycle; more specifically a single write in external memory CADS_UP 114 for an enqueue operation and a single read in external memory CADS_UP 114 for a dequeue operation.

Figure 7:
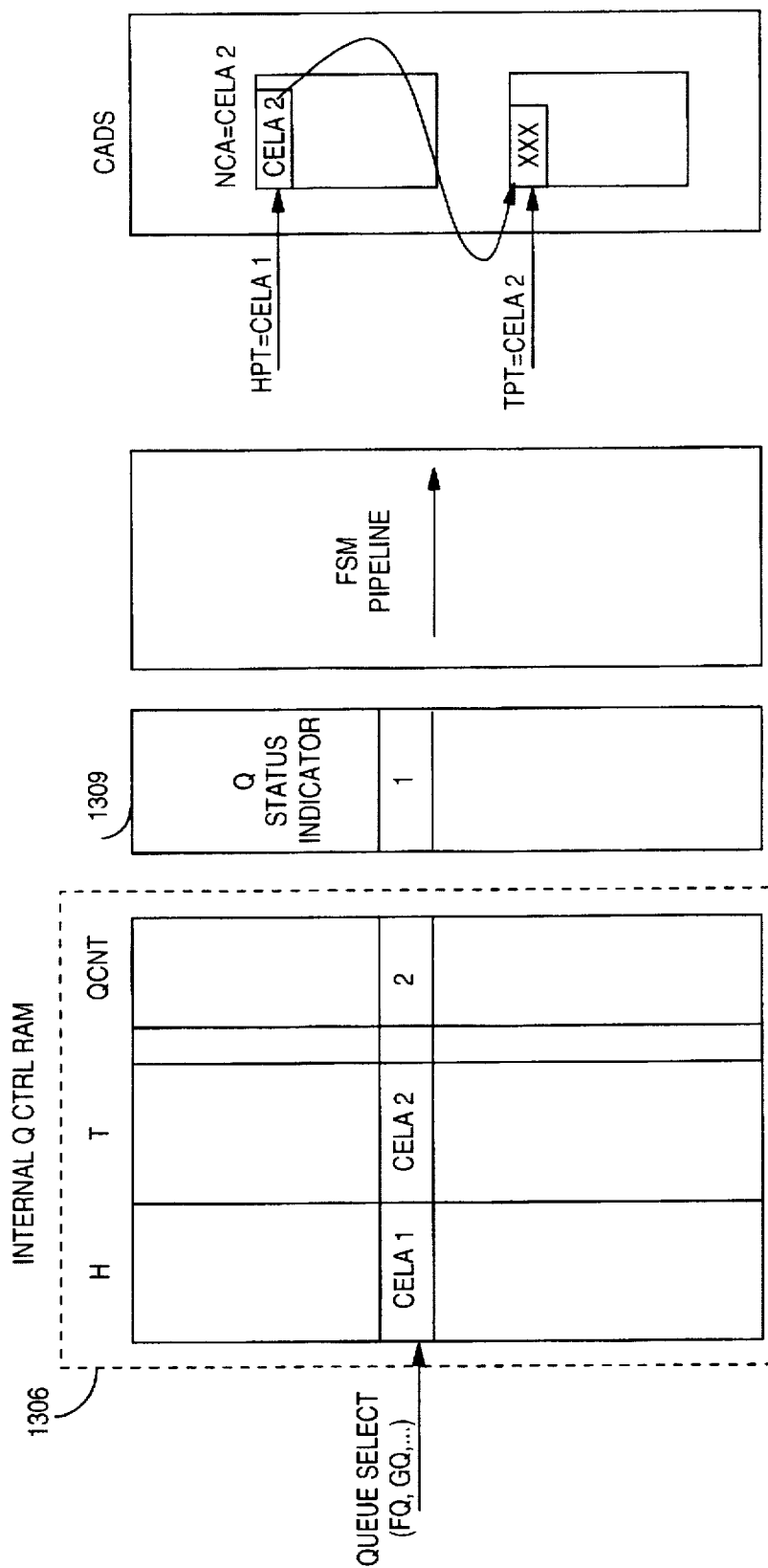
FIG. 7 and 8 detail the control of the sub-sections of the ATM adapter.

As detailed in FIG. 7, a queue is formed by a chain of Cell Addresses CELAs, each cell containing the Next Cell Address NCA. In addition, for each queue two pointers are used. The Head pointer H defines the first cell address of the queue, the Tail pointer T defines the last cell address of the queue. All the H and T pointers of different queues are held in the same internal RAM, the Queue Control having H and T parts (shown in FIG. 6).

Each queue also has a Queue Count QCNT which reflects the actual number of cells present inside the queue. QCNT is stored in the Q Ctrl RAM 1306, QCNT part, as shown in FIG. 7.

In a single cycle, the values for H pointer (Hptr), T pointer (Tptr) and QCNT, can be accessed in the Q Ctrl RAM 1306 for read and write operations.

In addition to the above, each queue has a Q Status Indicator 1309 placed in a dedicated register always available without a RAM read access requirement.

The values of Hptr, Tptr, QCNT and Q Status Indicator for different queue sizes are as follows:

Empty queue:
Hptr=Any value
Tptr=Any value
QCNT=0
Q Status=0
Queue with 1 cell:
Hptr=CELA1
Tptr=CELA1
QCNT=1
Q Status=1
Queue with 2 cells or more:
Hptr=CELA1
Tptr=CELA2
QCNT>=2
Q Status=1

The Enqueue operation is performed by use of the T pointer found in a Q Ctrl T read operation. This pointer is used to write the Cell Address CELA of the current cell to be enqueued as chaining information NCA (Next Cell Address), inside the cell referred to by T pointer in the external memory CADS_UP 114. The T pointer in the Q Ctrl T RAM 1306 must be replaced by the current Cell Address CELA. This is done through the pipeline.

Hence, consecutive enqueue operations must respect the pipeline latency and must be separated by, at least, 4 cycles. A subsequent enqueue operation must wait for the update of the T pointer in the Q Ctrl RAM 1306 before being processed.

The Dequeue operation is performed by use of the H pointer found in a Q Ctrl H read operation. The H pointer gives the Cell Address CELA of the cell to be dequeued.

The H pointer is also used as an address to read the NCA chaining information in the external memory CADS_UP. This NCA value is used to refresh the H pointer in the Q Ctrl H RAM through the pipeline.

Hence, consecutive dequeue operations must respect the pipeline latency and must be separated by, at least, 4 cycles. A subsequent dequeue operation must wait for the update of the H pointer in the Q Ctrl RAM 1306 before being processed.

According to the preceding description, enqueue and dequeue operations in a given queue can be done in any order without the need for an extra cycle between dequeue an enqueue operations. This is due to the fact that the enqueue operation uses the T pointer and the dequeue operation uses the H pointer, which are different resources containing different values.

But when a cell is enqueued in an empty queue, both the T pointer and the H pointer must be updated with the Cell Address CELA of the cell to be enqueued. An operation must ensure that any subsequent read operation will find a correctly updated H pointer value. This is accomplished by using the Q Status indicator 1309 as follows:

A dequeue operation can only take place if the Q Status indicator 1309 is equal to 1.

Figure 8:
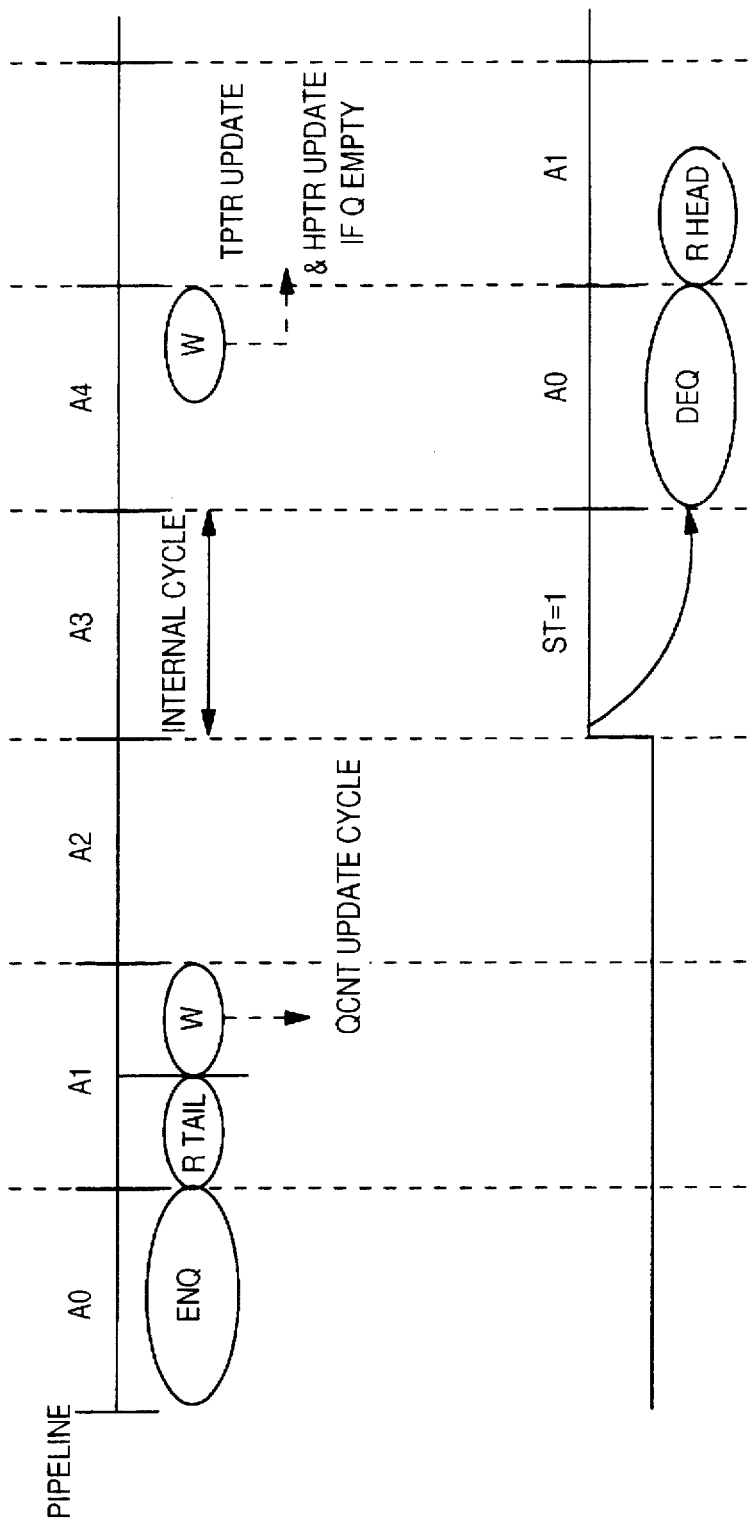

At enqueue on empty queue, the Q Status indicator 1309 is updated (set to 1) late enough (not before cycle A2 of the enqueue operation) to ensure that a dequeue operation on the same queue will fetch an updated H pointer (refer to FIG. 8).

As shown in FIG. 8, the QCNT RAM in Q Ctrl 1306 is updated in cycle A1 of the enqueue operation or dequeue operation. Then, an enqueue in the cycle following a dequeue operation will read, in its cycle A1, the right QCNT value corresponding to the state of the queue. In particular, in the case where the dequeue operation was the dequeue of the last cell of the queue, the enqueue will find a QCNT value equal to 0 and hence will update (in its cycle A4) both the T pointer and H pointer.

With the cases of empty queue contention solved, the requirements between enqueue and dequeue on the same queue can be summarized as follows:

Enqueue and dequeue on a given queue can be done asynchronously without any requirements, in any order, without inserting cycle between them;

Contiguous enqueues on the same queue must respect the pipeline latency and must be separated by a gap of 4 cycles, at least;

Contiguous dequeues on the same queue must respect the pipeline latency and must be separated by a gap of 4 cycles, at least.

These rules on the enqueue and dequeue operations allow a queue to be shared by two asynchronous processes, providing that one process performs enqueue operations only and the other process performs dequeue operations only.

A classical approach is to set a semaphore between the two processes, and to have one process wait for the semaphore-free indication which corresponds to the completion of the operation started by the other process. In the case of the high priority G Process sharing a queue with the low priority I Process, waiting for the semaphore free indication as done in the classical approach would severely impact its aggregate throughput capability.

The Finite State Machine (FSM) principle is based on a "walking one" bit circulating through a shift register ring which activates one FSM action per cycle.

These are two FSMs in the CAD_UP module 112. The G FSM has the highest priority over I FSM.

Figure 9:
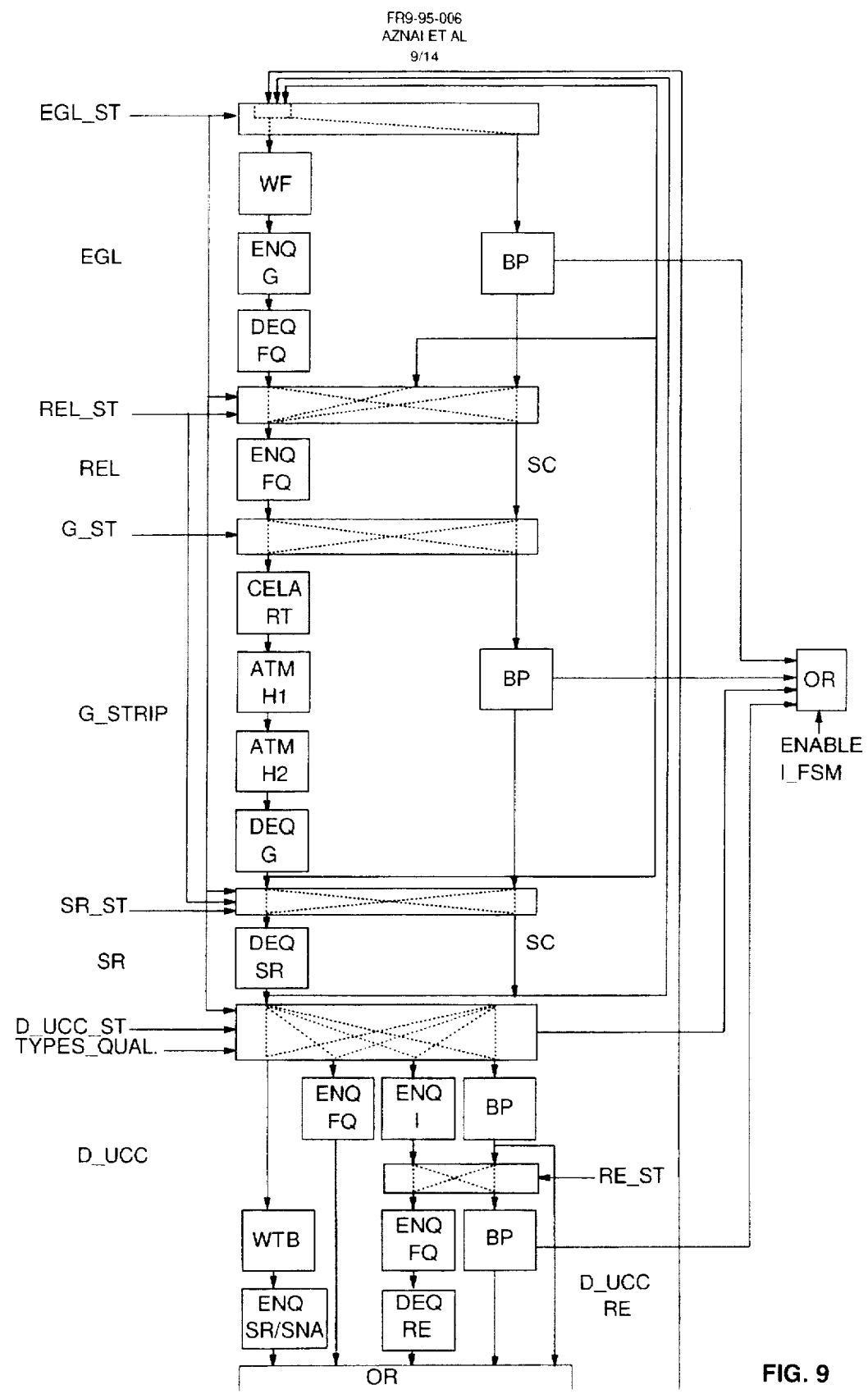
FIG. 9 and 10 show details of the control processors for the processes of FIG. 4, 5, 12 and 13.
Figure 10:
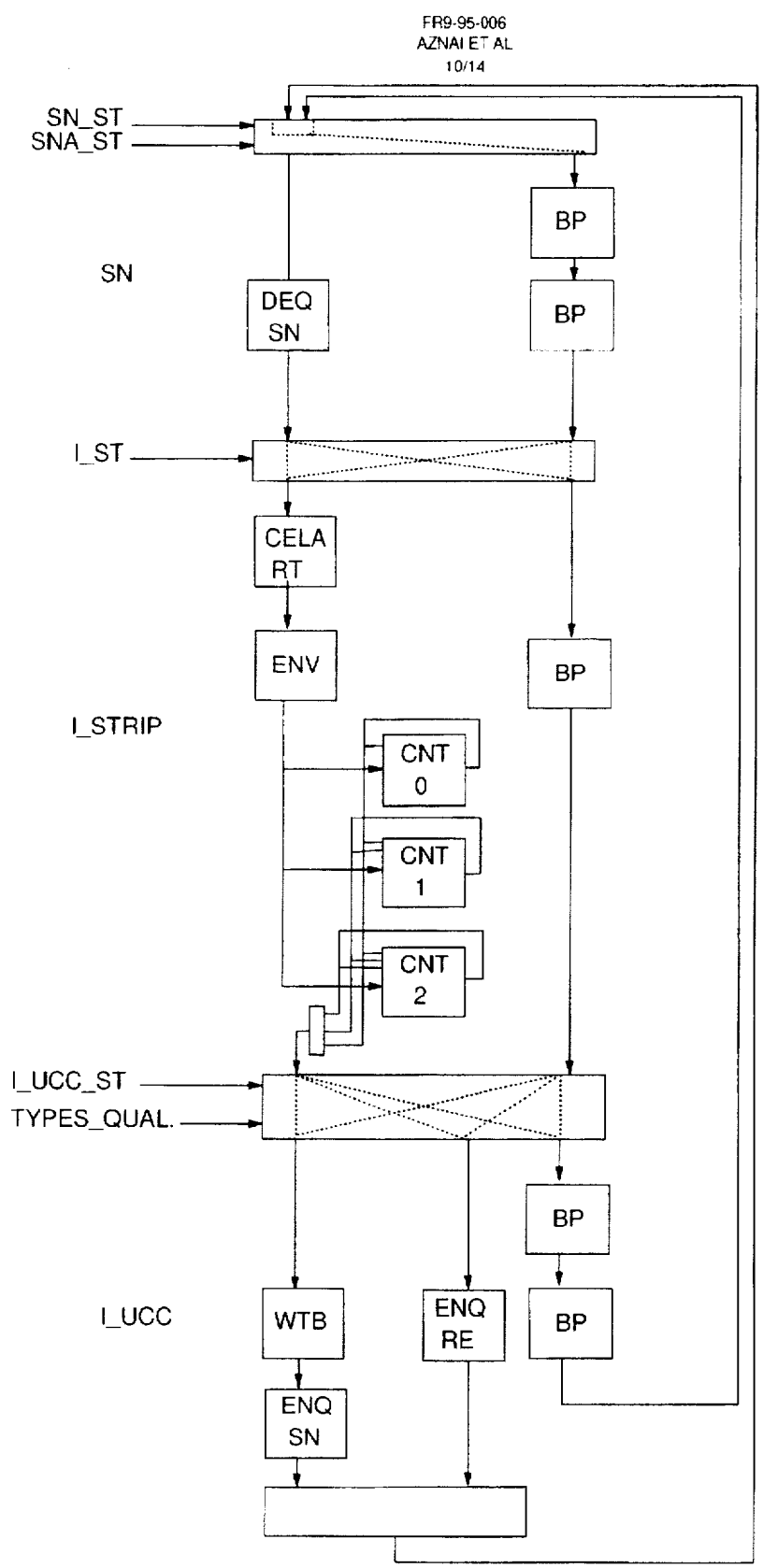

Each FSM is structured in sub-functions: EGL, REL, G_STRIP, SR, D_UCC and D_UCC_RE for the G FSM as shown in FIG. 9; SN, I_STRIP and I_UCC for the I FSM as shown in FIG. 10. When there is no activity (inactive status line such as EGL_ST, REL_ST, $G_i$_ST, SR_ST, D_UCC_ST, RE_ST for G FSM and SN_ST, SNA_ST, I_ST, I_UCC_ST for I FSM) for a given sub-function, this sub-function is bypassed by a BYPASS step (BP) during one cycle or can be short-cut (SC), without spending any cycle.

BP steps of the G FSM are given to the low priority I FSM. Short-cuts SC are used in the G FSM to sustain the maximum real-time aggregate throughput, in order not to spend any overhead cycle.

As shown on FIG. 9, the G FSM is made of a ring of latches (or States) whose actions are described below. In addition, loop-backs between sub-functions are implemented in order to prioritize EGL sub-function over SR and D_UCC sub-functions. These prioritization of the EGL sub-function is done in order to guarantee that input cells coming at media speed from the SFE Bus 132 are always stored inside the G Queue and avoid any overrun condition.

The following describes each of the sub-functions of the G FSM.

EGL (Enqueue G and Lease):

If there is a cell in the EGL stack (EGL_ST active) then activate the following states, else activate BP, which can be used by I FSM.

State WF: Update in the incoming Cell from PDM the F1F2 field with the Source Port SP.

State ENQ G: Enqueue the received cell in the G queue.

State DEQ FQ: Lease a new buffer from the Free Queue for next PDM data movement of the same port.

REL (Release):

If there is a cell in the REL stack (REL_ST active) then activate the following state, else short cut to G STRIP sub-function without spending any cycle.

State ENQ FQ: At the end of the SDM data movement, release the buffer by putting it in the Free Queue.

G_STRIP:

If there is a cell in the G Queue (G_ST active) then activate the following states, else activate BP, which can be used by I FSM.

State CELA RT: Take in G_Queue the first cell, and send this cell address CELA to the CAP_UP 116 through the U_BUS 107. This operation called "Read-Through" consists of reading an internal RAM and write its contents in another or same internal RAM without adding new logic resources, using the existing CADS external memory bus 1301.

State ATMH1: Read in Cell the first part of the VPINCI field and send it to the CAP_UP 116 thru the U_BUS 107.

State ATMH2: Read in Cell the second part of the VPINCI field and send it to the CAP_UP 116 through the U_BUS 107.

State DEQ G: Remove the cell from the G Queue.

SR (Switch Reserved Bandwith Queue):

If there is a cell in the SR Queue 1122 (SR_ST active) then activate the following state, else short-cut to D_UCC sub-function without spending any cycle.

State DEQ SR: Take in SR Queue the first cell, and give it to SDM function for data movement to Switch 100.

D_UCC (Direct U_BUS/CC_BUS):

If a cell has been received from the CAP_UP 116 in UCC FF 1316 (D_UCC_ST active) then activate the following states, else set BP which can be used by the I FSM.

Depending on the associated qualifier, 3 different actions are taken.

1. Normal feed.

This feed is done when a cell is to be forwarded. Prior to this, the cell has to be dressed, i.e. updated in the header with the forwarding information given by the CAP_UP 116.

State W TB: Update TB field of the cell, found by the CAP_UP 116. The TB ( Target Blade) indicates to the switch which is the output leg to sent the cell.

State ENQ SR: Once the cell is dressed, put it in the SR queue, ready to be sent to the Switch 100.

2. Release feed.

State ENQ FQ: Release the cell by enqueueing it in the Free Queue.

3. I Enqueue feed.

State ENQ I: Re-enqueue cell in I queue for further non-priority process.

D_UCC_RE (D UCC Relay Queue):

This FSM is started only after D_UCC ENQ I State or D_UCC BP state. If there is a cell in the RE Queue (RE_ST active) then activate the following states, else activate BP, which can be used by I FSM.

State ENQ FQ: Re-enqueue the cell from Relay Queue to Free Queue.

State DEQ RE: Remove this cell from Relay Queue.

As shown on FIG. 10, the I FSM is made of a ring of latches (or States) whose actions are described hereunder. Compared to G FSM, no loop-back or shortcut are implemented, as this process is not done on the fly. Each of the I FSM states is frozen when any active G FSM step runs, and I FSM is activated for each G FSM BP state.

The following details each of the sub-functions of the I FSM. SN (Switch Non-Reserved Bandwith Queue):

If there is a cell in the SN Queue 1212 or SNA Queue 1214 (SN_ST or SNA_ST active), then activate the following state, else activate BP.

State DEQ_SN: Remove the first cell of the SN Queue or SNA Queue and give it to the SDM for data movement to Switch 100.

I STRIP:

If there is a cell in the I Queue (I_ST active), then activate the following states, else activate BP.

State CELA RT: Take in I Queue the first cell, and send this Cell Address CELA to the CAP_UP 116 through the U_BUS 107 using the Read-Through mechanism.

State ENV and CNT(0,1,2): This part lasts 8 cycles and is implemented with a 3 bit counter CNT. This counter counts from 1 to 7 and then wraps back to 0. The steps corresponding to CNT=1 to CNT=7 are used to fetch the information described in the I Strip format detailed in FIG. 3. The step corresponding to CNT=0 dequeues the cell from the I Queue. cell from I Queue (Dequeue I).

I_UCC (Indirect UCC):

If a cell has been received from the CAP_UP 116 in the UCC FF 1316 (I_UCC_ST active) then activate the following states, else set BP. Depending on the associated qualifier, two different actions are taken.

Normal feed.

This feed is done when a cell is to be forwarded. Prior to this, the cell has to be dressed, i.e. updated in the header with the forwarding information given by the CAP_UP 116.

State W TB: Update the Target Blade field of the cell, by the value TB fed by the CAP_UP 116.

State ENQ SN: Once the cell is dressed, put it in the SN Queue 1212, ready to be sent to the Switch 100.

Release feed.

State ENQ RE: Release the cell by enqueueing it in the Free Queue.

The G FSM and I FSM share the same Free Queue FQ because these two FSMs need to release cells, then Enqueues in this Free Queue can be requested by both G FSM and I FSM.

On the other hand, any G FSM action can interrupt previously started I FSM operation, then Enqueue in Free Queue can be requested asynchronously without respecting the pipeline latency between two consecutive enqueue operations.

The use of the Relay Queue RE, along with the property of full asynchronism between enqueue and dequeue operations on the same queue, solve this problem; only I FSM can enqueue in the Relay Queue RE, only G FSM can dequeue from the Relay Queue RE.

When I FSM wants to enqueue in the Free Queue it will first enqueue in the Relay Queue, then the G FSM will dequeue from this Relay Queue and enqueue in the Free Queue (States DEQ RE and ENQ FQ of sub-function D_UCC_RE). Inside each FSM (G FSM and I FSM), consecutive enqueues or consecutive dequeues are protected by adequate minimum delay guaranteed between consecutive enqueue operation on a given queue, or consecutive dequeue operation on a given queue.

The FSM sub-functions have been structured in order to guarantee this minimum delay by using the adequate number of by-passes BP as shown on FIG. 9 and FIG. 10.

The second part of this description aims at describing part of the outgoing side, specifically the Common Atm Data mover module (Control_CAD_DOWN 156 or Blade_CAD_DOWN 122) and the contents of associated control RAM (Control_RAM 164 or Blade_RAM 124).

The detailed description of the preferred embodiment is given with references to Blades 102,104,106, but is fully applicable to Control 151.

The structure is highly symmetrical with the structure of the CAD_UP 112. The main difference lies in the reversed roles of the Port Data Movement PDM and Switch Data Movement SDM.

Figure 11:
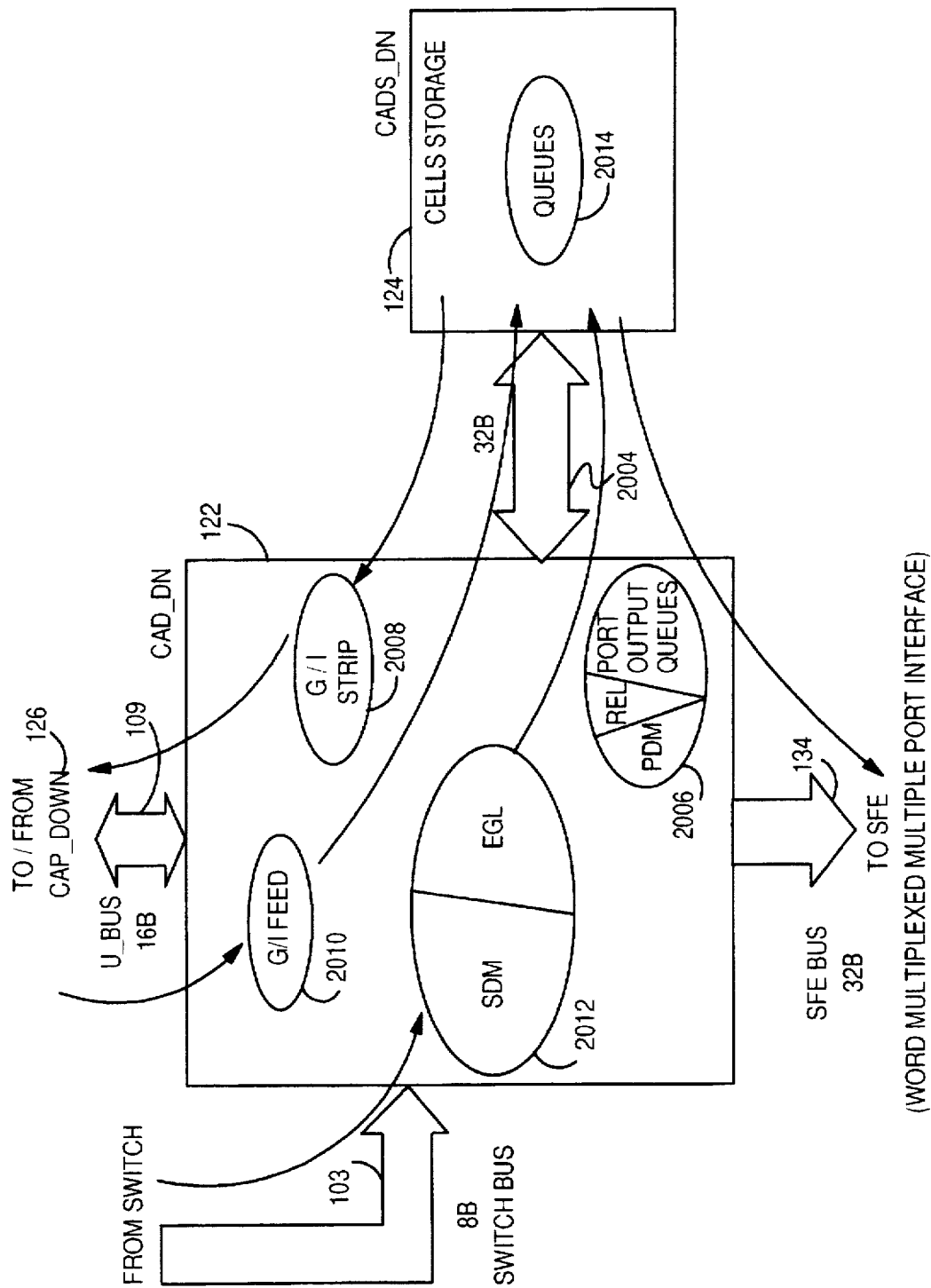

As shown on FIG. 11, the data flow of CAD_DN 122 is composed of three main flows: Port Data Movement PDM 2006, G Strip and I Strip 2008 and G Feed and I Feed 2010 converging on U-Bus 109, and Switch Data Movement 2012.

The Port Data Movement PDM 2006 gets cells from the output port queues and delivers them to the SFE Bus 134 as 32 bit words associated to the indication of the targetted port.

Once the last word of a cell has been sent, the corresponding Cell Buffer is given to the Release function REL 2006.

G Strip, G Feed, I Strip, I Feed exchange information on the U-Bus 109 between the CAD_DOWN 122 and the CAP_DOWN 126, the formats of which are detailed in FIG. 3.

When a cell is held in the G Queue 2014, the function G Strip 2008 of the CAD_DOWN 122 sends to the CAP_DOWN 126 the minimum information needed to perform the label swap and forwarding of the cell following the G Strip format: Cell Address CELA, ATM connection identification such as VPI and VCI, Source Blade SB, and control information characterizing the cell.

The function G Feed 2010 receives information fed back by the CAP_DOWN 126, corresponding to the following cases:

When the cell belongs to an established connection, it is updated with the forwarding information and enqueued in the appropriate Port Output Queue in 2006. The information received in this case follows the Feed Normal format containing Cell Address CELA, Target Port TP instead of Target Blade TB as shown for the CAD_UP 112, and Traffic Type TTCtl.

When the cell is an internal control cell sent by the Control_Processor 150, it is enqueued in the I Queue for further processing. The information received in this case follows the Enq I format containing only Cell Address CELA.

When the cell does not belong to an established connection, it is released by the REL function in 2006. The information received in this case follows the Release format containing only Cell Address CELA.

G Strip and G Feed processes are done on the fly, unlike the I Strip and I Feed processes which can only take place when no G process is running. When a cell is held in the I Queue, the I Strip function 2008 of the CAD_DOWN 122 sends all the required information needed to perform the task requested by the cell. For instance, an internal control cell contains the information following the I Strip format. The I Strip format contains Cell Address CELA, F1F2 containing the Source Blade SB, Internal Control Field ICF specifying the type of action to be taken with this cell, Half Word 1 HW1 to Half Word N HWN of the cell payload—the number of Half Words to be considered in the cell payload being determined by the Internal Control Field value.

The function I Feed 2010 receives information fed back by the CAP_DOWN 126, corresponding to the following cases:

When the task requested by the cell is completed, the cell is released by the REL function in 2006. The information received in this case follows the Release format containing only Cell Address CELA, as shown in FIG. 3.

When the task requested does not involve the CAD_DOWN 122 or CAP_DOWN 126, the cell is updated with the forwarding information and enqueued in the appropriate Port Output Queue in 2006. The information received in this case follows the Feed I Cell format containing Cell Address CELA, and Target Port TP, instead of Target Blade TB as shown for the CAD_UP 112.

The I Strip and I Feed processes are considered as low priority and can run only if no G process is running.

The Switch Data Movement SDM in 2012 receives the incoming cells from the Switch Bus 103 as successive 64 byte words and converts them to a 32 bit word format.

The SDM moves each cell through the CADS Bus 2004 into the external memory CADS_DOWN 124 at a Cell Address CELA. The cell is then enqueued in the G Queue in 2014 by the EGL mechanism 2012. In addition, the EGL 2012 prepares a new cell buffer for the next data movement.

From the above flow description, two layers of processes are implemented in the CAD_DOWN 122: G Process and I Process.

Figure 12:
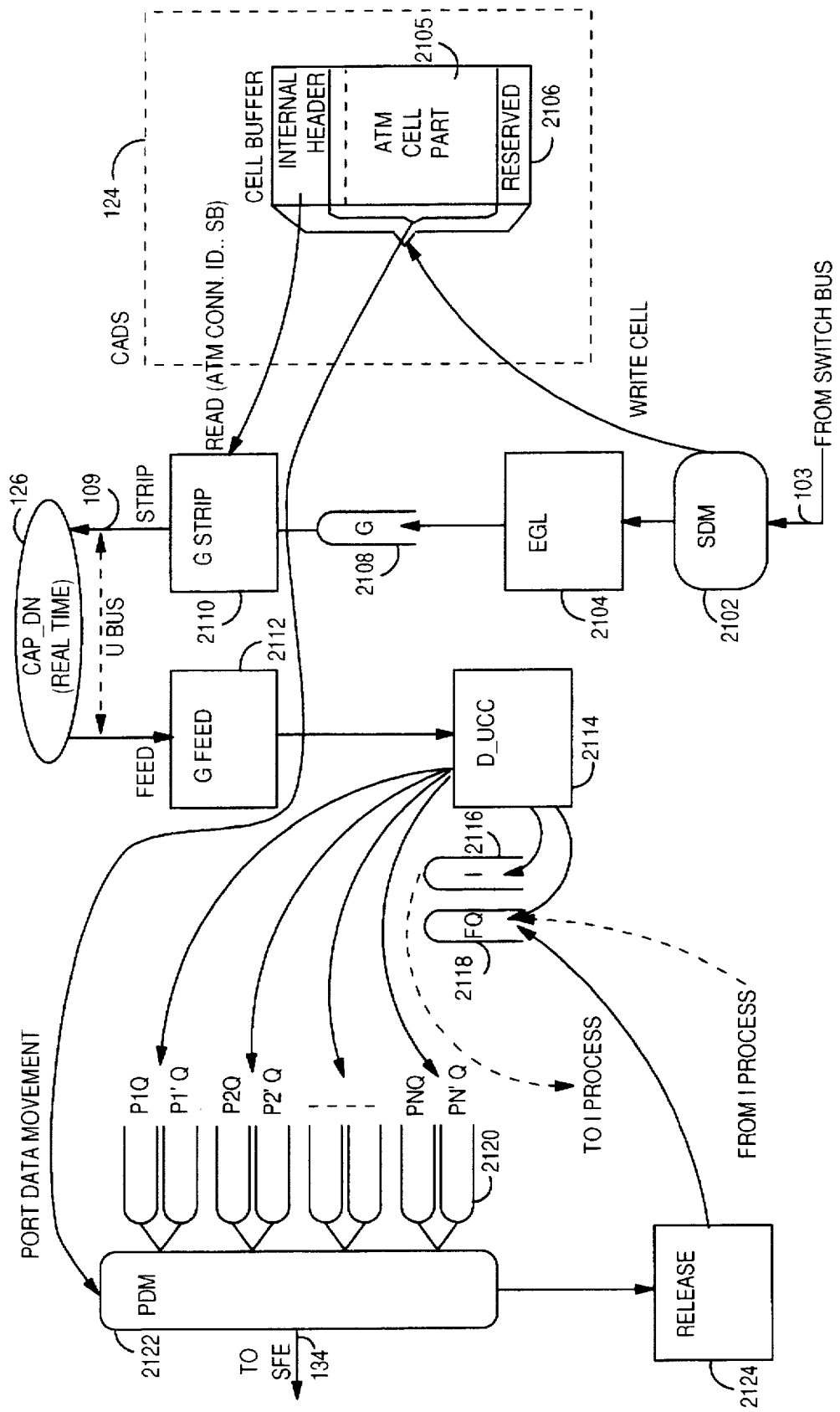

The G Process flow is shown in FIG. 12.

The G Process results from decision taken by the CAP_DN 126 on the ATM connection identifier which was received by the G Strip operation 2008 along with the Source Blade SB indication and the type of cell. The CAP_DN 126 exploits the ATM connection identifier and gives to the G Process all information in order to:

Decide whether the cell processing must be done in real time, this G Process whether the Cell processing may be carried out in the I Process when more complex processing has to be done.

Exploit the processor swapping information found by the CAP_DN 126 after SB/ATM connection identifier look-up function. This information is the Target Port TP which must be given to the PDM 2006 to forward the given cell to the appropriate Port, and the new VPI/CI value.

The Switch Data Movement SDM 2102 is explained below.

A outgoing cell received on the Switch Bus 103 is received byte per byte, one byte at each Switch cycle, and is moved in 32 bit word format into the external memory CADS_DOWN 124. The SDM 2102 receives 16 words per cell arriving from the Switch 100, and writes them into a Cell Buffer 2106 located in external memory CADS_DOWN 124. Then the SDM 2102 feeds the EGL 2104 with the address pointer CELA of the cell.

The Enqueue in G Queue and Lease EGL 2104 uses the Cell Address CELA given by the SDM 2102 to enqueue the received cell in the G Queue 2108. Then, it leases a new Cell Buffer 2106 by dequeueing a new cell pointer from the Free Queue 2118 to allow further data movement from the Switch 100.

The Free Queue 2118 is the chain of all Cell Buffers currently available.

The G Strip function 2110 dequeues the next cell from the G Queue 2108. Then it sends to the CAP_DOWN 126 the Cell Address CELA, the ATM connection identifier, the F1F2 field containing the Source Blade and control information characterizing the cell, retrieved from the Cell Buffer 2106.

The G Feed function 2112 accepts the response of the CAP_DOWN 126 to the G Strip. Since G Strip 2110 and G Feed 2112 are asynchronous functions, the response is correlated with the Cell Address CELA, and it carries information defining the process to be performed.

The Direct U_BUS reception mechanism D_UCC 2114 performs different tasks depending on the type of response received by G Feed 2112:

Upon reception of Release format the D_UCC 2114 releases the cell by enqueing it in the Free Queue 2118.

Upon reception of Enq I format the D_UCC 2114 postpones the cell for I Processing by enqueueing it in the I Queue 2116.

Upon reception of Feed Normal format the D_UCC 2114 enqueues the cell in the appropriate Pn Queue or Pn' Queue in 2120 depending on the value of the TTCtl field received by G Feed 2112, and where "n" is equal to the Target Port TP.

The Port Data Movement PDM 2122 scans the port output queues giving priority to PQ over P'Q, and fetches the 13 words of the ATM Cell part 2105 of the Cell Buffer 2106 and sends it in a word format on the SFE Bus 134. Once the last byte of the cell has been sent, the Cell Buffer is given to the Release function 2124.

The Release function 2124 releases the Cell Buffer by enqueueing it in the Free Queue 2118.

Figure 13:
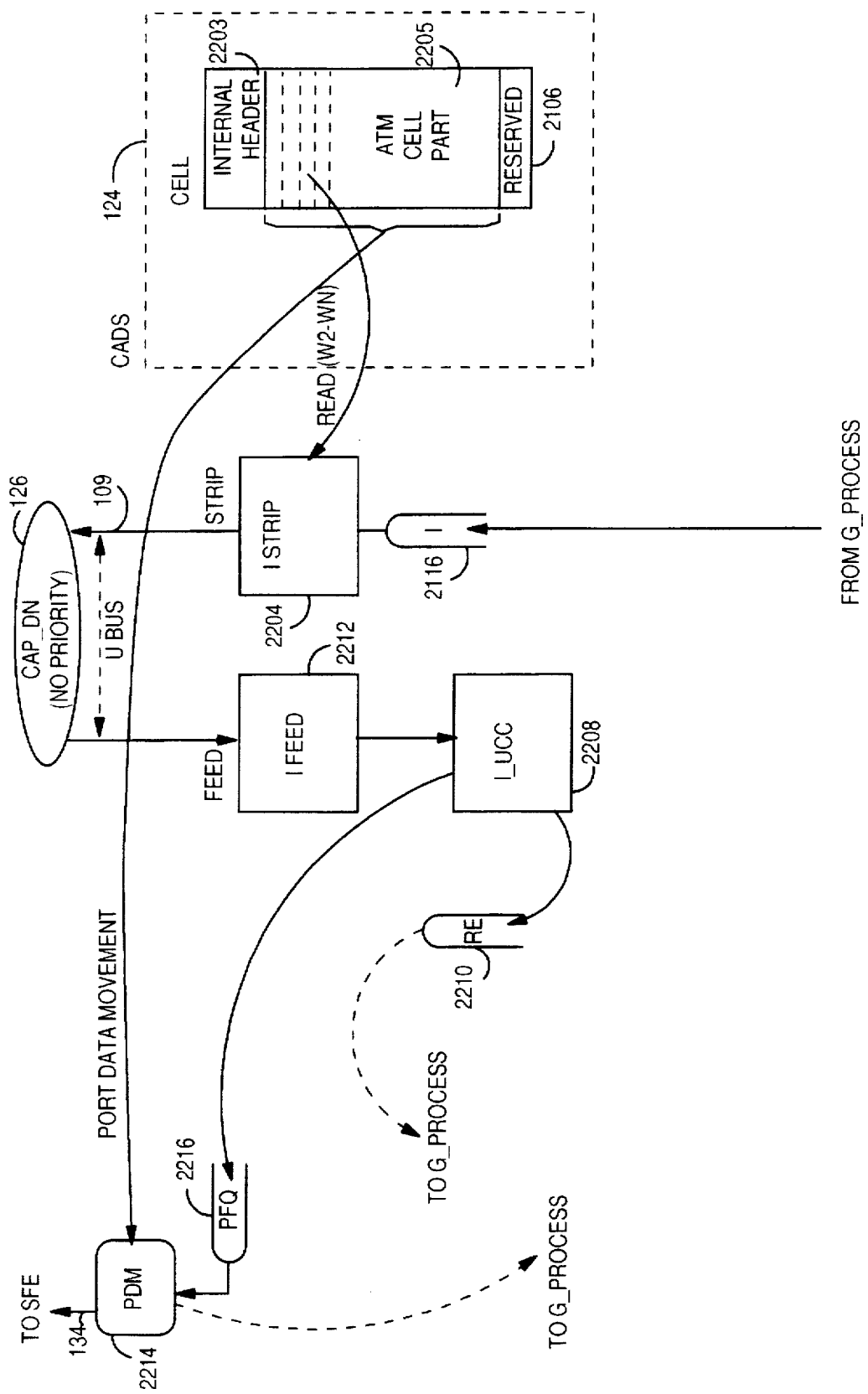

The I Process flow is shown on FIG. 13.

The I Process performs all actions that can be delayed by a G Process action. The I process results from a decision taken by the CAP_DOWN 126 on the ATM Payload, which was given to the CAP_DN 126 by the I strip operation. As the I Process is not a real time process, longer fields can be exchanged in this process compared to the G Process. It is used to handle the Internal Control Cells.

It can be used to provide Local Area Network Media Access Control (MAC) addresses in order for the CAP_DN 126 to perform LAN frame forwarding on ATM connections dedicated to transport of LAN traffic. It can also be used to give the IP Address to the CAP_DN 126 or any network address found inside the ATM Cell payload.

The I Strip function 2204 dequeues the next cell from the I Queue 2116. Then it sends to the CAP_DOWN 126 the Cell Address CELA, the F1F2 field containing the Source Blade SB and control information characterizing the cell, the Internal Control Field ICF, and word 2 to word N of Cell Buffer 2106, the value of N being taken in the ICF field.

The I Feed function 2212 accepts the response of the CAP_DOWN 126 to the I Strip. Since I Strip 2204 and I Feed 2212 are asynchronous functions, the response is correlated with the Cell Address CELA, and it carries information defining the process to be performed.

The Indirect U_BUS reception mechanism I_UCC 2208 performs different tasks depending on the type of response received by I Feed 2212:

Upon reception of Release format the I_UCC 2208 prepares release of the cell by enqueing it in the Relay Queue RE 2210. The RE queue 2210 will be handled by the G Process, in order to release the cell. This RE queue 2210 acts as a relay between I and G processes.

Upon reception of Feed I Cell format enqueues the cell in the PF Queue 2216 which is used by the control flow to reach the Control_Processor 150.

The Port Data Movement PDM 2214 is triggered when the PF Queue 2216 is not empty and fetches the 13 words of the ATM Cell part 2105 of the Cell Buffer 2106 and sends it in a word format on the SFE Bus 134. Once the last byte of the cell has been sent, the Cell Buffer is given to the Release function 2124.

The CAD_DOWN 122 Structure is detailed below.

Figure 14:
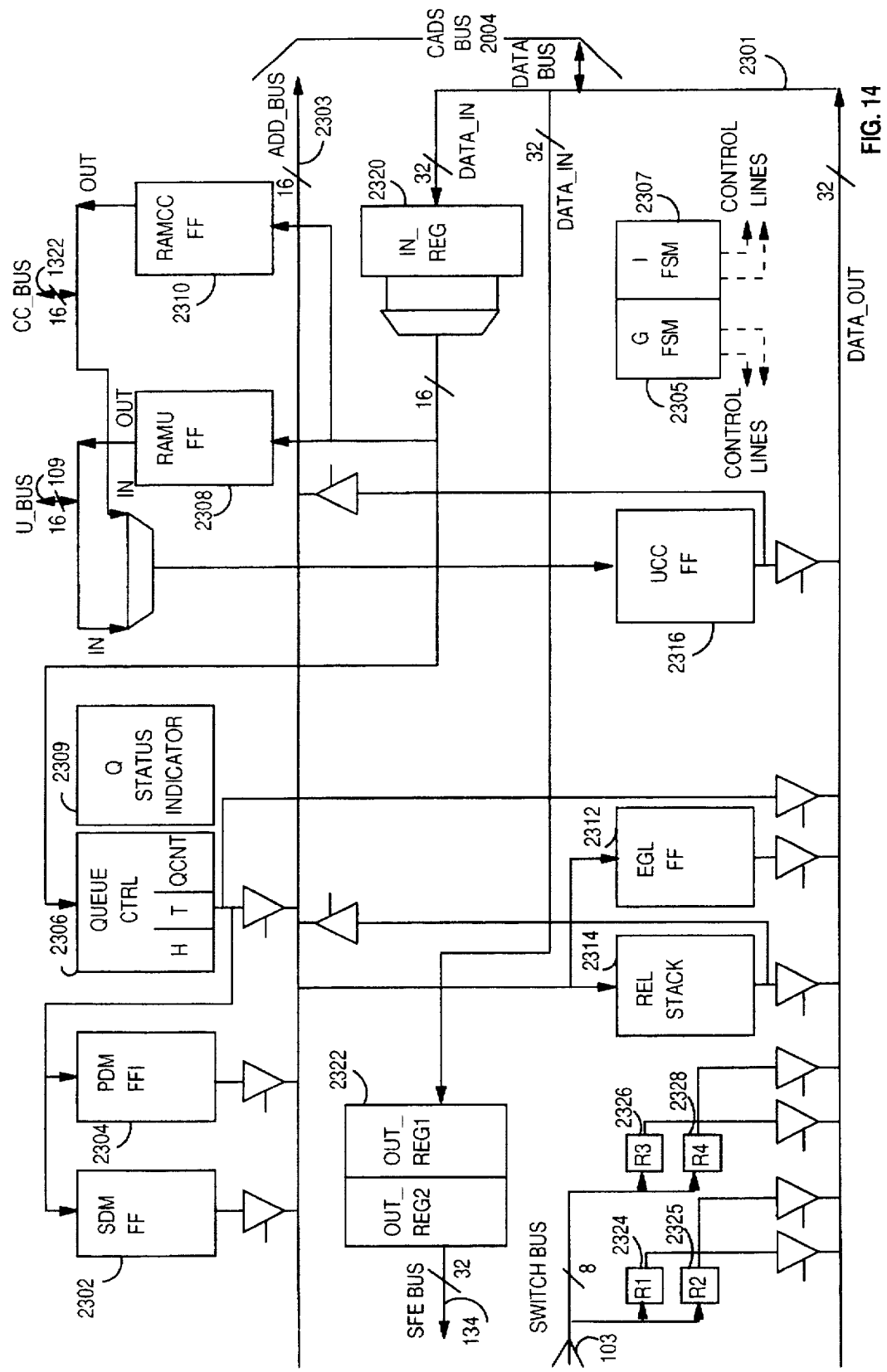

The structure of the CAD_DOWN 122, as depicted in FIG. 14, is based on the structure of the CAD_UP 112.

The data flow shown on the previous figures run on the following buses:

The SFE_BUS 134 has 32 bits of Data which are directly taken from the OUT_REGs 2322 which allow the timing adaptation between external memory CADS_DATA_BUS 2004 and SFE Bus 134.

The CADS_DATA_BUS 2301 and CADS_ADD_BUS 2303, the U_BUS 109 and the CC_BUS 1322 have the same function and structure than respectively the CADS_DATA_BUS 1301 and CADS_ADD_BUS 1303, the U_BUS 107 and the CC_BUS 1322 of the CAD_UP 112, as described above.

The SW_BUS 103 feeds the four Registers R1 to R4 to demultiplex the data bytes received as contiguous into 32 bit word for the CADS_DATA_BUS 2301.

SDM FF 2302 and PDM FFi 2304 are respectively structured as SDM FF 1302 and PDM FFi 1304, as described for the CAD_UP 112, but they have their roles reversed.

The QUEUE CTRL 2306 associated to the Queue Status Indicator 2309 has the same structure as the QUEUE CTRL 1306 as described for the CAD_UP 112, but it contains in addition all the necessary information to handle all the Port Queues 2120 and the PFQ 2216.

The RAMU FF 2308 and RAMCC FF 2310 have respectively the same structure as the RAMU FF 1308 and RAMCC FF 1310, as described for the CAD_UP 112.

The EGL 2312 is a stack filled with CELAs when a cell has been received from the SDM interface. The EGL CELAs are used by the EGL mechanism.

The REL Stack 2314 contains the list of CELAs to be released after PDM data movement.

The UCC FF 2316 has a Flip Flop for G Feed information and a Flip Flop for I Feed information sent by the CAP_DOWN 126, to be used by the D_UCC 2114 or I_UCC 2208 mechanisms.

The IN_REG 2320 is a 32 bit register which receives words from the CADS_DATA_BUS 2301, and multiplexes them into 16 bit half words for internal RAMs feedings. It also adapts external memory CADS_DOWN 124 cycles to internal CAD_DN 112 cycles.

The OUT_REGs 2322 are 32 bit registers used to transfer the CADS_DATA_BUS 2301 to the SFE_BUS 134 and perform resynchronization between these two buses.

As in the CAD_UP 112, the G FSM 2305 and the I FSM 2307 control all the preceding blocks of the structure by means of dedicated states describing the control actions to be taken.

What is claimed is:

1. A data switch including at least one adapter having a plurality of input ports on which asynchronous transfer mode (ATM) cells may be received and a plurality of output ports on which ATM cells may be transmitted and a switching fabric through which a particular ATM cell may be switched from one of said input ports to a target output port on the basis of addressing information associated with the ATM cell, each said adapter including:

a) means for distinguishing high priority input ATM cells from lower priority input ATM cells;
   b) first ATM cell processing means for processing high priority input ATM cells on a real time basis; and
   c) second ATM cell processing means for processing lower priority input ATM cells on a non-real time basis, said second ATM cell processing means operating only when said first ATM cell processing means is idle.

2. A data switch as set forth in claim 1 wherein said first cell processing means processes high priority input cells at a rate equal to or greater than the rate at which cells are received on said input ports while said second cell processing means processes lower priority input cells at a different, lower rate.

3. A data switch as set forth in claim 1 wherein said data switch further includes cell buffers for storing cells to be processed either by said first cell processing means or said second cell processing means.

4. A data switch as set forth in any of claims 1 through 3 wherein said distinguishing means further comprises:

a) means for reading header information contained in each input cell; and
   b) means responsive to the header information to classify the cell either as a high priority cell or a lower priority cell.

5. For use in a data switch including at least one adapter having a plurality of input ports on which asynchronous transfer mode (ATM) cells may be received and a plurality of output ports on which ATM cells may be transmitted and a switching fabric interposed between the input ports and the output ports, a method of handling multi-priority ATM data traffic, said method comprising the steps of:

a) reading the header of each received ATM cell to determine whether the cell should be processed as a high priority cell or a lower priority cell;
   b) processing high priority cells on a real time basis; and
   c) processing lower priority cells on a non-real time basis and only when no high priority cells are being processed.

6. A method as set forth in claim 5 wherein the high priority cells are processed at a rate equal to or greater than the rate at which cells are received at the switch.

* * * * *

UNITED STATES PATENT AND TRADEMARK OFFICE
CERTIFICATE OF CORRECTION

PATENT NO. : 5,768,273
DATED : June 16, 1998
INVENTOR(S) : Aznar et al

It is certified that error appears in the above-identified patent and that said Letters Patent is hereby corrected as shown below:

On the title page item 22 should read Oct. 25, 1995

Signed and Sealed this

First Day of September, 1998

Attest:

BRUCE LEHMAN

*Attesting Officer*  *Commissioner of Patents and Trademarks*